US011673580B2

(12) United States Patent
Kang (10) Patent No.: US 11,673,580 B2
(45) Date of Patent: Jun. 13, 2023

(54) APPARATUS AND METHOD FOR CONTROLLING BRAKING OF AUTONOMOUS VEHICLE

(71) Applicants: HYUNDAI MOTOR COMPANY, Seoul (KR); KIA MOTORS CORPORATION, Seoul (KR)

(72) Inventor: Dong Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 259 days.

(21) Appl. No.: 17/007,965

(22) Filed: Aug. 31, 2020

(65) Prior Publication Data

US 2021/0179147 A1   Jun. 17, 2021

(30) Foreign Application Priority Data

Dec. 17, 2019   (KR) ........................ 10-2019-0169287

(51) Int. Cl.
*B60W 60/00* (2020.01)
*B60W 30/18* (2012.01)
*B60W 40/068* (2012.01)
*B60W 40/105* (2012.01)

(52) U.S. Cl.
CPC .... *B60W 60/00184* (2020.02); *B60W 30/181* (2013.01); *B60W 40/068* (2013.01); *B60W 40/105* (2013.01); *B60W 2510/18* (2013.01); *B60W 2552/40* (2020.02)

(58) Field of Classification Search
CPC ......... B60W 60/00184; B60W 30/181; B60W 40/068; B60W 40/105; B60W 2510/18; B60W 2552/40
See application file for complete search history.

(56) References Cited

U.S. PATENT DOCUMENTS 9,358,962 B2 *  6/2016  Zambou .............. B60W 30/165
2019/0168722 A1 *  6/2019  Schroeder ................ B60T 7/22

FOREIGN PATENT DOCUMENTS

JP           2019085017 A   *   6/2019

* cited by examiner

*Primary Examiner* — Aniss Chad
*Assistant Examiner* — Christine Nguyen Huynh
(74) *Attorney, Agent, or Firm* — Lempia Summerfield Katz LLC (57) ABSTRACT

A method for controlling braking of an autonomous vehicle includes: recognizing, by a driving situation recognizer, a vehicle stop situation based on environment information around the vehicle; generating, by a deceleration profile generator, a $n^{th}$-order polynomial-based deceleration profile having a plurality of inflection points (n being a natural number equal to or greater than three) when the vehicle stop situation is recognized; correcting, by a corrector, the $n^{th}$-order polynomial-based deceleration profile by setting at least one of a response time of a decelerator, a mass of the vehicle during driving or a deceleration performance of a brake to a control variable; and executing, by a controller, braking of the vehicle based on the corrected $n^{th}$-order polynomial-based deceleration profile.

15 Claims, 8 Drawing Sheets

APPARATUS AND METHOD FOR CONTROLLING BRAKING OF AUTONOMOUS VEHICLE

CROSS-REFERENCE TO RELATED APPLICATION

This application claims priority to and the benefit of Korean Patent Application No. 10-2019-0169287, filed on Dec. 17, 2019, the entire contents of which are incorporated by reference.

FIELD

The present disclosure relates to an apparatus and method for controlling braking of an autonomous vehicle.

BACKGROUND

The statements in this section merely provide background information related to the present disclosure and may not constitute prior art.

If a vehicle suddenly brakes so as to be stopped during autonomous driving, acceleration is applied in the direction opposite to the driving direction of the vehicle due to deceleration during a braking period, and force which is applied in the driving direction due to inertial force is applied to passengers in the vehicle. Particularly, at the moment when wheels of the vehicle are stopped on a road surface, this phenomenon becomes more severe.

Figure 1A:
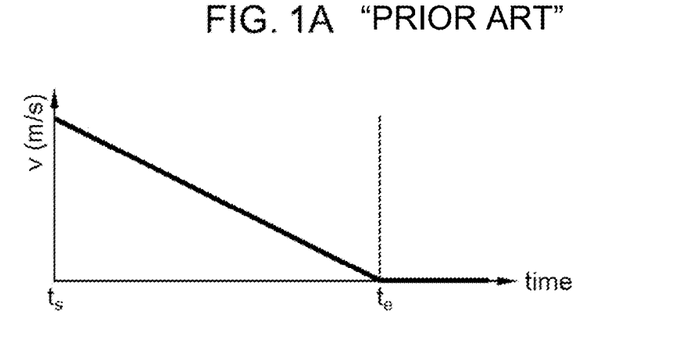
FIGS. 1A to 1C are graphs representing a conventional deceleration profile for controlling braking of a vehicle during autonomous driving.
Figure 1B:
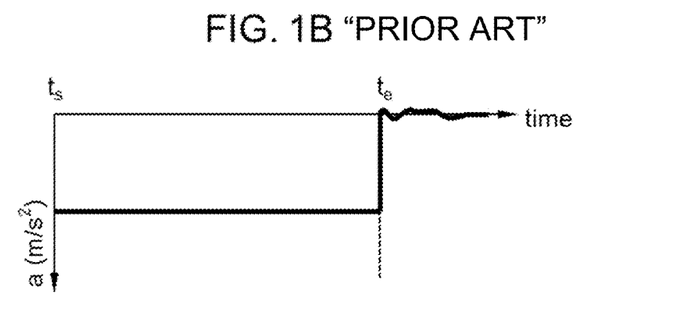
Figure 1C:
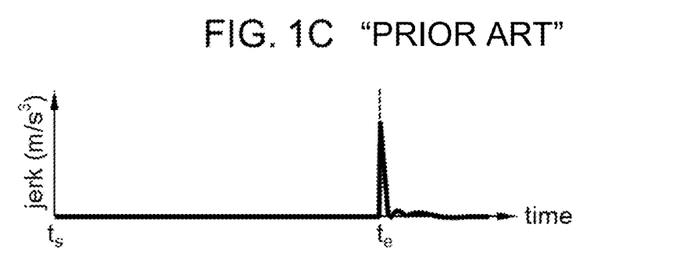

In more detail, referring to FIGS. 1A to 1C illustrating a conventional deceleration profile in braking during autonomous driving, a target speed at the moment $t_e$ when the vehicle is stopped is set to 0, and deceleration of the vehicle is controlled at a constant deceleration a. However, at the moment $t_e$ when the vehicle is stopped, relative motion between the vehicle and the road surface suddenly disappears, the deceleration a is changed to 0, a very strong jerk occurs, and thus the passengers in the vehicle feel discomfort due to inertial force.

Further, in the conventional deceleration profile, we have discovered that the standardized deceleration is calculated depending only on the braking distance and the current speed of the vehicle, without considering the performance of a braking system in the vehicle, for example, the response speed of a decelerator or the degree of wear of a brake pad. Therefore, if the deceleration a at the moment $t_s$ when braking of the vehicle is started is low, noise and vibration are caused due to insufficient grip force between the brake pad and a wheel disc, and durability of the braking system is deteriorated.

SUMMARY

The present disclosure provides an apparatus and method for controlling braking of an autonomous vehicle that substantially obviate one or more problems due to limitations and disadvantages of the related art.

In one form of the present disclosure, an apparatus and a method for controlling braking of an autonomous vehicle may generate a high-order polynomial-based deceleration profile so as to improve passenger ride comfort at the moment when a vehicle is stopped, and the deceleration profile is actively corrected based on the response speed of a decelerator and the deceleration performance of a brake so as to improve durability of a braking system.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a method for controlling braking of an autonomous vehicle in consideration of ride comfort includes: recognizing, by a driving situation recognizer, a vehicle stop situation based on environment information around the vehicle; when the vehicle stop situation is recognized, generating, by a deceleration profile generator, a $n^{th}$-order (n being a natural number equal to or greater than three) polynomial-based deceleration profile having a plurality of inflection points; correcting, by a corrector, the $n^{th}$-order polynomial-based deceleration profile by setting at least one of a response time of a decelerator, a mass of the vehicle during driving or a deceleration performance of a brake to a control variable; and executing, by a controller, braking of the vehicle based on the corrected $n^{th}$-order polynomial-based deceleration profile.

In the generating the $n^{th}$-order polynomial-based deceleration profile, an initial slope of the $n^{th}$-order polynomial-based deceleration profile may be determined based on at least one of a driving speed of the vehicle, a target braking distance or a coefficient of friction of a road surface on which the vehicle is traveling.

The inflection points may include a first inflection point at which a deceleration has a local maximum value at a first time, and a second inflection point at which the deceleration has a local minimum value at a second time later than the first time.

In the correcting the $n^{th}$-order polynomial-based deceleration profile, when the response time of the decelerator is greater than a first reference value, the $n^{th}$-order polynomial-based deceleration profile may be corrected so as to shift a position of the first inflection point to a time earlier than the first time.

In the correcting the $n^{th}$-order polynomial-based deceleration profile, when the response time of the decelerator is less than the first reference value, the $n^{th}$-order polynomial-based deceleration profile may be corrected so as to shift a position of the first inflection point to a time later than the first time.

In the correcting the $n^{th}$-order polynomial-based deceleration profile, when the mass of the vehicle is less than a second reference value, the $n^{th}$-order polynomial-based deceleration profile may be corrected so as to shift a position of the second inflection point to a time earlier than the second time.

In the correcting the $n^{th}$-order polynomial-based deceleration profile, when the mass of the vehicle is greater than the second reference value, the $n^{th}$-order polynomial-based deceleration profile may be corrected so as to shift a position of the second inflection point to a time later than the second time.

In the correcting the $n^{th}$-order polynomial-based deceleration profile, when the deceleration performance of the brake is less than a third reference value, the $n^{th}$-order polynomial-based deceleration profile may be corrected so as to increase the initial slope.

In the correcting the $n^{th}$-order polynomial-based deceleration profile, when the deceleration performance of the brake is greater than the third reference value, the $n^{th}$-order polynomial-based deceleration profile may be corrected so as to decrease the initial slope.

It is to be understood that both the foregoing general description and the following detailed description of the present disclosure are exemplary and explanatory.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, examples of which are illustrated in the accompanying drawings. However, the disclosure of the present disclosure is not limited to the forms set forth herein, and may be variously modified. In the drawings, in order to clearly describe the present disclosure, a description of elements which are not related to the present disclosure is omitted, and the same or similar elements are denoted by the same reference numerals even though they are depicted in different drawings.

In addition, in the following description of the forms, the terms "first", "second", etc. may be used to describe various elements, but do not limit these elements. It will be understood that these terms are used only to discriminate one element from other elements, and do not limit the nature, sequence or order of the corresponding elements. It will be understood that terms which are specially defined in consideration of the configurations and functions of the forms are used only to describe the forms and do not limit the scope of the forms.

It will be understood that a singular expression of an element encompasses a plural expression of the element unless stated otherwise. In the following description of the forms, the terms "including", "having", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless stated otherwise.

In the following description of the forms, all terms including technical or scientific terms have the same meanings as generally understood by those skilled in the art to which the present disclosure pertains, unless defined otherwise. Further, in the following description of the forms, generally used terms, such as terms defined in dictionaries, will be interpreted as having meanings coinciding with contextual meanings in the related art, and are not to be interpreted as having ideal or excessively formal meanings, unless defined clearly.

Hereinafter, an apparatus for controlling braking of an autonomous vehicle according to one form of the present disclosure will be described with reference to the accompanying drawings.

Figure 2:
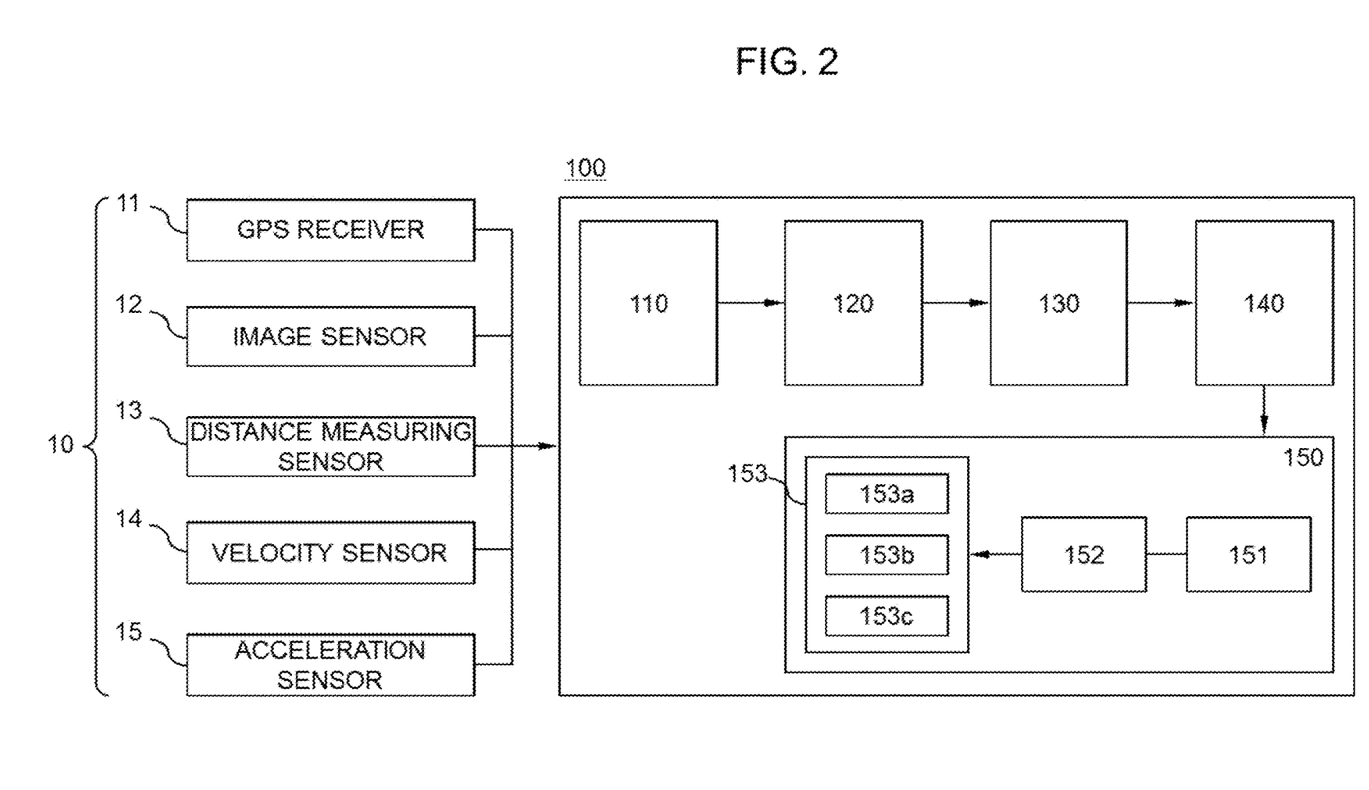
FIG. 2 is a block diagram illustrating the configuration of an apparatus for controlling braking of an autonomous vehicle in one form of the present disclosure.

FIG. 2 is a block diagram illustrating the configuration of an apparatus for controlling braking of an autonomous vehicle according to one form of the present disclosure.

Referring to FIG. 2, an apparatus 100 for controlling braking of an autonomous vehicle according to the present disclosure may include a driving situation recognizer 110, a deceleration profile generator 120, a corrector 130, a controller 140, and a brake unit 150. However, this configuration of the apparatus 100 is only exemplary, and at least one of the above-described elements may be omitted or other elements may be additionally provided.

The driving situation recognizer 110 may collect environment information around the vehicle through various sensors 10 mounted in the vehicle, and recognize a vehicle stop situation based on the environment information. Here, the sensors 10 may include a global positioning system (GPS) receiver 11, an image sensor 12, a distance measuring sensor 13, a velocity sensor 14, and an acceleration sensor 15, etc.

The GPS receiver 11, which is configured to estimate the geographical position of the vehicle, may collect the current position (including the latitude and longitude) of the vehicle in real time by receiving navigation messages from GPS satellites located above the earth.

The image sensor 12 may recognize signal lights peripheral vehicles, lanes, objects on a road, etc. based on an image acquired by photographing the area around the vehicle. Further, the image sensor 12 may collect signal light information, for example, the state of a signal light which has been turned-on (a red light, a yellow light, a green light, a left-turn signal or the like) by processing the acquired image, such as noise removal, image quality and saturation adjustment, file compression, etc.

The distance measuring sensor 13 may measure a distance between the vehicle and a peripheral vehicle, and, for example, be implemented as a radar, a lidar, an ultrasonic sensor or the like. The distance measuring sensor 13 may measure a distance from the peripheral vehicle, the direction and height of the peripheral vehicle, etc. by emitting electromagnetic waves, a laser pulse or ultrasonic waves to the peripheral vehicle and then measuring an arrival time of these waves reflected by the peripheral vehicle.

The velocity sensor 14 may measure the driving speed of the vehicle based on an output waveform of the wheel speed of the vehicle which is differentially acquired.

The acceleration sensor 15 may measure an acceleration, which varies when the vehicle is accelerated (or decelerated), based on a driving (or braking) signal applied to the vehicle.

The driving situation recognizer 110 may recognize the vehicle stop situation by collecting signal light information in front of the vehicle and behavior information of peripheral vehicles from the image sensor 12 and the distance measuring sensor 13, and acquire driving information of the vehicle regarding a target braking distance between the current position of the vehicle and a stop point, the driving speed of the vehicle, characteristics of the road surface, etc.

The deceleration profile generator 120 may generate a high-order polynomial-based deceleration profile having a plurality of inflection points based on the driving information of the vehicle. This will be described below with reference to FIGS. 3A and 3B.

Figure 3A:
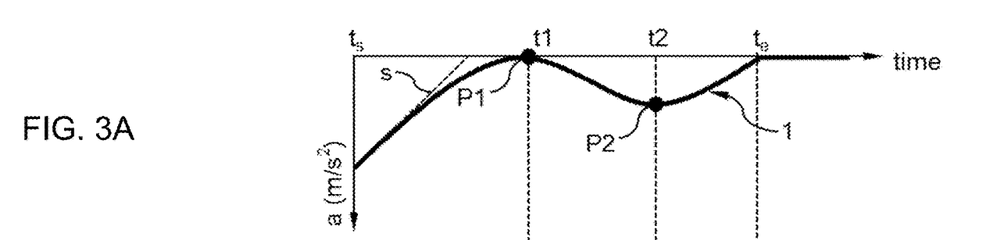
FIGS. 3A and 3B are graphs representing a deceleration profile according to one form of the present disclosure.
Figure 3B:
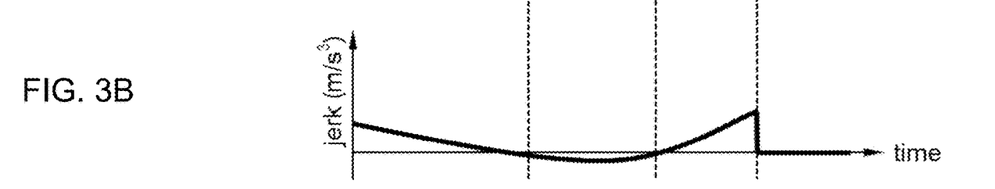

FIGS. 3A and 3B are graphs representing a deceleration profile according to one form of the present disclosure.

In general, ride comfort experienced by a passenger in the vehicle is determined by a deceleration "a" and/or a change in the deceleration "a", which is experienced as "a jerk". The reason for this is that, when the range of fluctuation of the deceleration "a" or the "jerk" is great at the moment when the vehicle is stopped, the passenger's body is pulled in the driving direction due to inertial force, which causes great discomfort.

Therefore, the deceleration profile generator 120 according to one form may generate a deceleration profile 1 using a high-order polynomial, as shown in FIGS. 3A and 3B, and thereby, deceleration of the vehicle may be controlled so as to avoid a sudden change in the deceleration "a" (i.e., a jerk) at the moment $t_e$ when the vehicle is stopped.

Referring to FIGS. 3A and 3B, the deceleration profile generator 120 may generate a $n^{th}$-order polynomial-based deceleration profile 1 (n represents a natural number equal to or greater than three) having a plurality of inflection points. Here, the deceleration "a" moves along at least one rising curve and at least one falling curve between the moment $t_s$ when braking of the vehicle is started and the moment $t_e$ when the vehicle is stopped, and maintains a value of 0 after the moment $t_e$ when the vehicle is stopped.

The deceleration profile generator 120 may determine an initial slope "s" of the deceleration profile 1 based on at least one of the driving speed of the vehicle, the target braking distance or the coefficient of friction of a road surface, and extract the inflection points P1 and P2 based on a change in the shift characteristics of the deceleration "a". Here, the initial slope "s" of the deceleration "a" may indicate a change in the deceleration "a" at the moment $t_s$ when braking of the vehicle is started, and each of the inflection points P1 and P2 may mean a point at which the deceleration "a" transitions from a rising curve to a falling curve or a point at which the deceleration "a" transitions from a falling curve to a rising curve. For example, the inflection points P1 and P2 may include a first inflection point P1 at which the deceleration "a" has a local maximum value at a first time t1, and a second inflection point P2 at which the deceleration "a" has a local minimum value at a second time t2 later than the first time t1, and, at occurrence times t1 and t2 of the first and second inflection points P1 and P2 (hereinafter, referred to inflection times), the jerk has a value of 0.

As such, if the deceleration profile 1 for controlling deceleration of the vehicle is generated based on a high-order polynomial other than a constant or a straight line, a change in the jerk is gentle and small and thus ride comfort may be improved.

Although the deceleration profile 1 shown in FIGS. 3A and 3B is based on a third-order polynomial, this deceleration profile 1 is only exemplary and does not limit the scope of the present disclosure. For example, the deceleration profile 1 applied to the present disclosure may be generated based on a high-order polynomial, such as a fourth-order polynomial or higher.

Further, the deceleration profile generator 120 may set the above-described deceleration profile 1 to a default, and transmit the deceleration profile 1 to the corrector 130.

Referring to FIG. 2 again, the corrector 130 may correct the deceleration profile 1 by setting factors influencing ride comfort (hereinafter, referred to as influential factors) to control variables. Here, the influential factors may include at least one of a response time of a decelerator 152, the mass of the vehicle, or the deceleration performance of a brake 153.

The reason why the corrector 130 corrects the deceleration profile 1 using the influential factors is as follows. If the inflection times t1 and t2 of the deceleration profile 1 are still maintained even though the response time of the decelerator 152 or the mass of the vehicle is changed, a change in the response speed of the decelerator 152 or inertial force may not be reflected when deceleration of the vehicle is controlled, and thus, ride comfort is lowered. Further, if the initial slope "s" of the deceleration profile 1 is still maintained even though the deceleration performance of the brake 153 is deteriorated, grip force between a disc rotor 153a and a brake pad 153c is insufficient and may thus cause noise and vibration. This will be described below in more detail.

The controller 140 may calculate a braking force based on the corrected deceleration profile, and apply a deceleration command to the brake unit 150 so as to perform braking of the vehicle.

The brake unit 150 may include a motor 151 which generates power, the decelerator 152 which decreases the RPM of the motor 151 in response to the deceleration command so as to amplify an output torque, and the brake 153 which brakes the vehicle using the output torque of the decelerator 152. Here, the brake 153 includes the disc rotor 153a which is coupled to a vehicle wheel, a piston 153b which reciprocates in the axial direction due to rotation of the decelerator 152, and the brake pad 153c which pressurizes the disc rotor 153a due to the reciprocating motion of the piston 153b, and the disc rotor 153a and the brake pad 153c are brought into contact with each other by the piston 152b and thus causes frictional force, thereby braking the vehicle.

Hereinafter, methods for correcting the deceleration profile will be described with reference to FIGS. 4A to 6B.

Figure 4A:
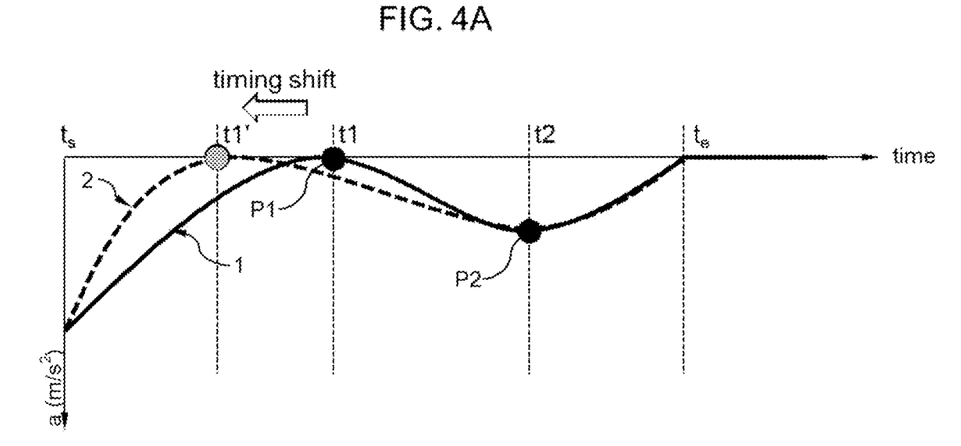
FIGS. 4A and 4B are graphs illustrating one exemplary method for correcting the deceleration profile using the apparatus according to one form of the present disclosure.
Figure 4B:
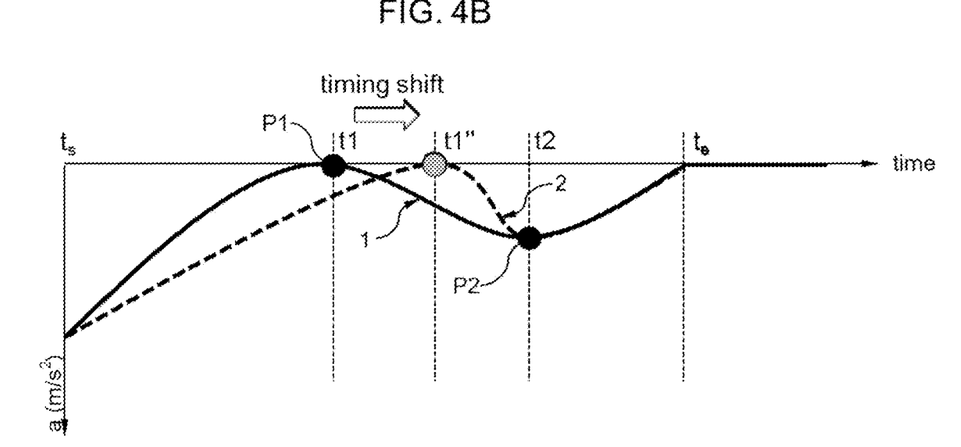

FIGS. 4A and 4B are graphs illustrating one exemplary method for correcting the deceleration profile using the apparatus according to one form of the present disclosure.

As shown in FIGS. 4A and 4B, the corrector 130 may correct the deceleration profile 1 based on the response time of the decelerator 152.

The corrector 130 may detect the response time of the decelerator 152, compare the response time with a first reference value, and correct the deceleration profile 1 so as to shift the position of the first inflection point P1. Here, the response time may mean a time taken to execute deceleration behavior after applying the deceleration command to the decelerator 152, and the first reference value may be a predetermined response time in consideration of the response speed of the decelerator 152 at the time of release of the vehicle and the number of years used of the decelerator 152.

Here, the position of the first inflection point P1 may be shifted parallel to the left or right along the horizontal axis (time axis) in the graphs shown in FIGS. 4A and 4B. That is to say, the corrector 130 may shift only the inflection time t1 while maintaining the constant deceleration "a" at the first inflection point P1, thereby being capable of outputting a corrected deceleration profile 2.

When the detected response time of the decelerator 152 is greater than the predetermined first reference value, the corrector 130 may correct the deceleration profile 1 so as to shift the position of the first inflection point P1 to a time t1' earlier than the first time t1 (with reference to FIG. 4A). That is, the corrector 130 may, when the response speed of the corrector 130 is slow, advance the inflection time of the first inflection point P1 (t1→t1') so as to compensate for a delayed response.

On the other hand, when the detected response time of the decelerator 152 is less than the predetermined first reference value, the corrector 130 may correct the deceleration profile 1 so as to shift the position of the first inflection point P1 to a time t1" later than the first time t1 (with reference to FIG. 4B). That is, the corrector 130 may, when the response speed of the corrector 130 is fast, delay the inflection time of the first inflection point P1 (t1→t1") so as to compensate for an early response.

Further, when the detected response time of the decelerator 152 is the same as the predetermined first reference value, the corrector 130 may maintain the position of the first inflection point P1.

Figure 5A:
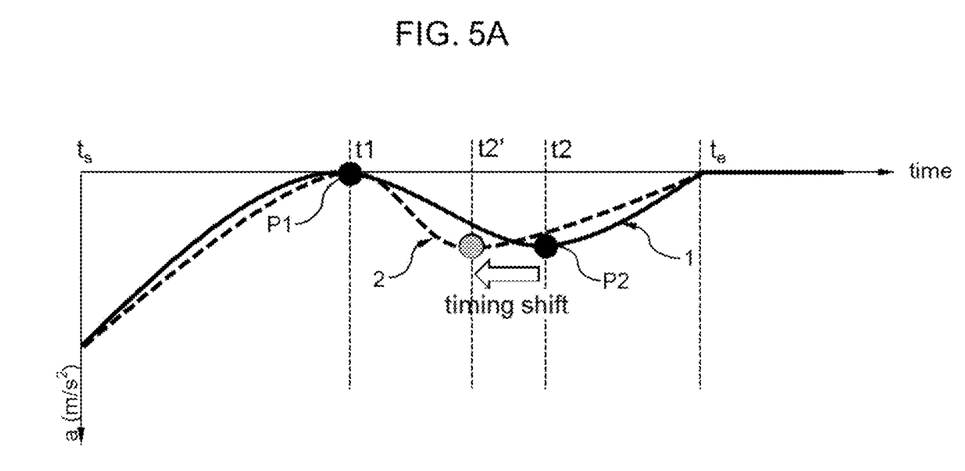
FIGS. 5A and 5B are graphs illustrating another exemplary method for correcting the deceleration profile using the apparatus according to one form of the present disclosure.
Figure 5B:
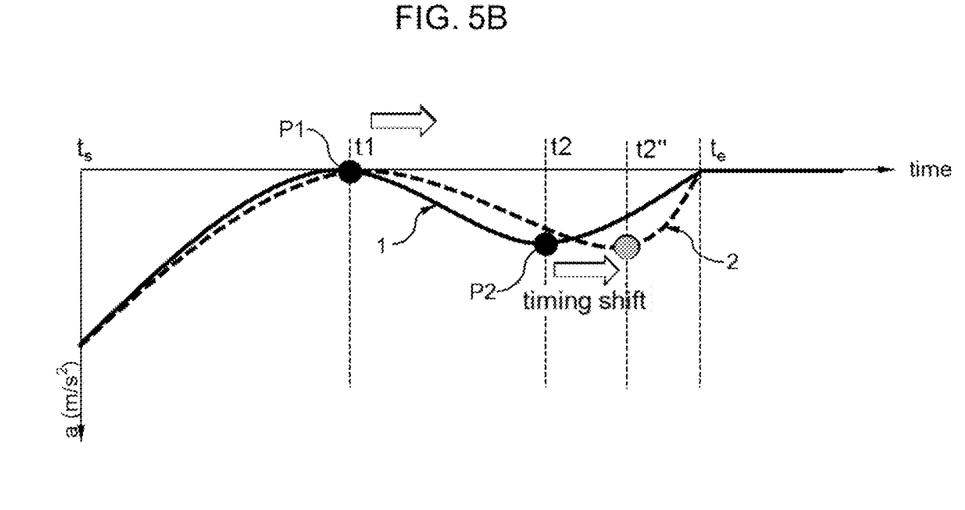

FIGS. 5A and 5B are graphs illustrating another exemplary method for correcting the deceleration profile using the apparatus according to one form of the present disclosure.

As shown in FIGS. 5A and 5B, the corrector 130 may correct the deceleration profile 1 in consideration of the mass of the vehicle.

The corrector 130 may calculate the mass of the vehicle during driving, compare the mass of the vehicle with a second reference value, and correct the deceleration profile 1 so as to shift the position of the second inflection point P2. For example, the corrector 130 may calculate the mass (m=F/a) of the vehicle during driving using an acceleration "a" of the vehicle measured by the acceleration sensor 15 when a designated driving force "F" is applied to the vehicle. Further, the second reference value may be a predetermined mass of the vehicle, acquired by summing the weight of a vehicle body and the weight of passengers including a driver.

Here, the position of the second inflection point P2 may be shifted parallel to the left or right along the horizontal axis (time axis) in the graphs shown in FIGS. 5A and 5B. That is to say, the corrector 130 may shift only the inflection time t2 while maintaining the constant deceleration "a" at the second inflection point P2, thereby being capable of outputting a corrected deceleration profile 2.

When the mass of the vehicle during driving is less than the predetermined second reference value, the corrector 130 may correct the deceleration profile 1 so as to shift the position of the second inflection point P2 to a time t2' earlier than the second time t2 (with reference to FIG. 5A). That is, the corrector 130 may, when the mass of the vehicle during driving is changed and thus inertial force applied to the vehicle at the moment $t_e$ when the vehicle is stopped is decreased, advance the inflection time of the second inflection point P2 (t2→t2') so as to improve ride comfort when the vehicle is stopped.

On the other hand, when the mass of the vehicle during driving is greater than the predetermined second reference value, the corrector 130 may correct the deceleration profile 1 so as to shift the position of the second inflection point P2 to a time t2" later than the second time t2 (with reference to FIG. 5B). That is, the corrector 130 may, when the mass of the vehicle during driving is changed and thus inertial force applied to the vehicle at the moment $t_e$ when the vehicle is stopped is increased, delay the inflection time of the second inflection point P2 (t2→t2") so as to improve ride comfort when the vehicle is stopped.

Further, when the mass of the vehicle during driving is the same as the predetermined second reference value, the corrector 130 may maintain the position of the second inflection point P2.

Figure 6A:
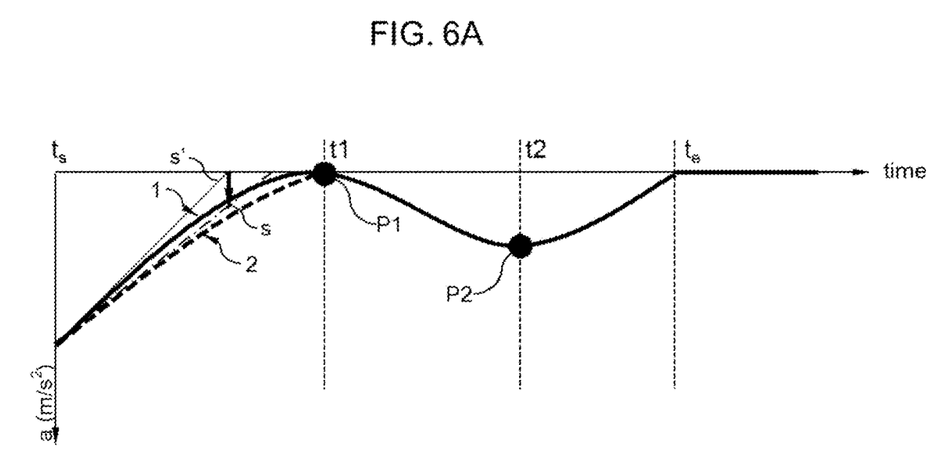
FIGS. 6A and 6B are graphs illustrating yet another exemplary method for correcting the deceleration profile using the apparatus according to one form of the present disclosure.
Figure 6B:
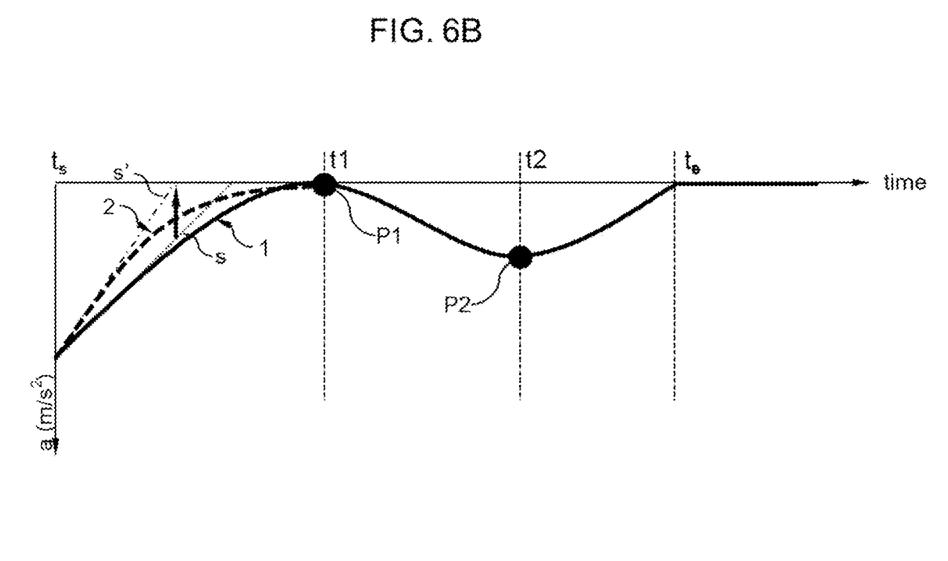

FIGS. 6A and 6B are graphs illustrating yet another exemplary method for correcting the deceleration profile using the apparatus according one form of the present disclosure.

As shown in FIGS. 6A and 6B, the corrector 130 may correct the deceleration profile 1 based on the deceleration performance of the brake 153.

The corrector 130 may calculate the deceleration performance of the brake 153, compare the deceleration performance with a third reference value, and correct the deceleration profile 1 so as to increase or decrease the initial slope "s" of the deceleration a. For example, the corrector 130 may calculate the deceleration performance by calculating actual braking force output from the brake 153 relative to the braking force corresponding to the deceleration command, and in this case, determine the deceleration performance in further consideration of the applied pressure and the degree of wear of the brake pad 153c. Further, the third reference value may be a predetermined value corresponding to the ideal deceleration performance of the brake 153, which is set by a developer.

Here, in a corrected deceleration profile 2, only the initial slope "s" of the deceleration "a" may be increased or decreased at the moment $t_s$ when braking of the vehicle is started, while the first and second inflection points P1 and P2 are maintained. That is to say, the corrector 130 may increase or decrease a deceleration rate at the moment $t_s$ when braking of the vehicle is started, thereby being capable of properly compensating for insufficient or excessive grip force depending on the deceleration performance of the brake 153.

When the deceleration performance of the brake 153 is less than the predetermined third reference value, the corrector 130 may correct the deceleration profile 1 so as to increase the initial slope "s" of the deceleration a (s→s') (with reference to FIG. 6A). That is, the corrector 130 may, when the deceleration performance of the brake 153 is deteriorated, increase the initial slope "s" of the deceleration "a" so as to increase the deceleration rate, thereby being capable of compensating for insufficient grip force between the disc rotor 153a and the brake pad 153c, reducing or minimizing noise and vibration caused thereby and thus improving durability of the brake 153.

On the other hand, when the deceleration performance of the brake 153 is greater than the predetermined third reference value, the corrector 130 may correct the deceleration profile 1 so as to decrease the initial slope "s" of the deceleration a (s→s") (with reference to FIG. 6B). That is, the corrector 130 may, when the deceleration performance of the brake 153 is improved, adjust the initial slope "s" of the deceleration "a" so as to decrease an unnecessarily high deceleration rate, thereby being capable of improving fuel efficiency and braking efficiency.

Further, when the deceleration performance of the brake 153 is the same as the predetermined third reference value, the corrector 130 may maintain the initial slope "s" of the deceleration "a" at the moment $t_s$ when braking of the vehicle is started.

Hereinafter, referring to FIGS. 7 and 8, a method for controlling braking of an autonomous vehicle according to one form of the present disclosure will be described.

Figure 7:
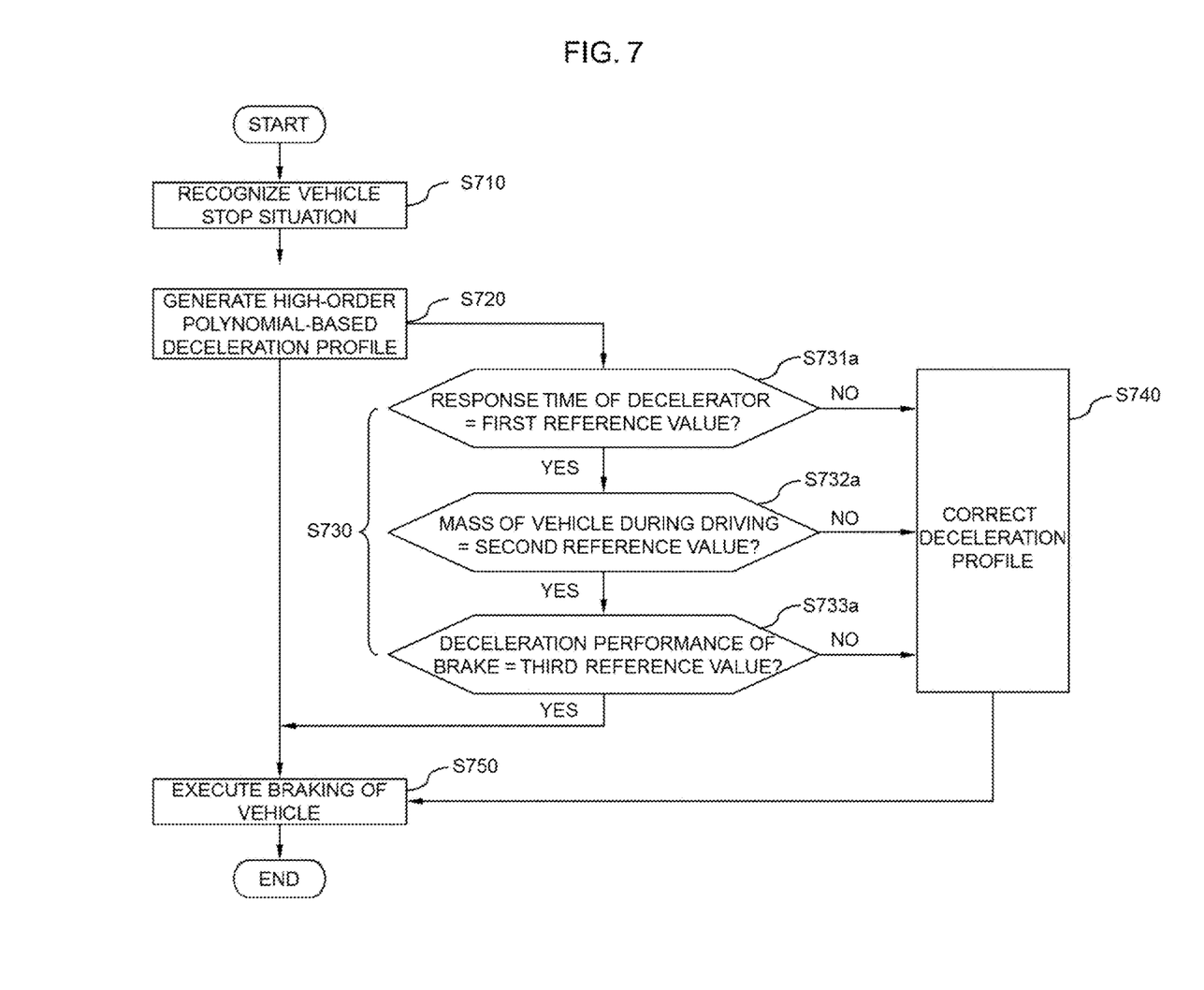
FIG. 7 is a flowchart illustrating a method for controlling braking of an autonomous vehicle according to one form of the present disclosure.

FIG. 7 is a flowchart illustrating a method for controlling braking of an autonomous vehicle in one form of the present disclosure.

Referring to FIG. 7, the method may include recognizing a vehicle stop situation by collecting environment information around the vehicle (S710), generating a high-order polynomial-based deceleration profile 1 having a plurality of inflection points (S720), setting factors influencing ride comfort to control variables and comparing the factors with predetermined reference values (S730), correcting the deceleration profile as a result of the comparison (S740), and executing braking of the vehicle based on the deceleration profile (S750).

In S710, the apparatus 100 may recognize the vehicle stop situation by collecting signal light information about an area in front of the vehicle, behavior information of peripheral vehicles, etc., from various sensors installed in the vehicle.

In S720, the apparatus 100 may determine an initial slope "s" of the deceleration profile 1 in consideration of at least one of a driving speed of the vehicle, a target braking distance or a coefficient of friction of a road surface, and extract a plurality of inflection points P1 and P2 in consideration of a change in the shift characteristics of a deceleration "a". A detailed description thereof has been given above with reference to FIGS. 3A and 3B, and will thus be omitted.

In S730, the apparatus 100 may determine whether or not the response time of a decelerator, the mass of the vehicle during driving, and the deceleration performance of a brake are respectively the same as predetermined first, second and third reference values (S731a, S732a and S733a).

When all of operations of S731a, S732a and S733a are satisfied, the apparatus 100 may execute braking of the vehicle while maintaining the deceleration profile 1 generated in S720 (S750).

On the other hand, when at least one of the operation of S731a, S732a or S733a is not satisfied, the apparatus 100 may correct the deceleration profile 1 (S740), and execute braking of the vehicle based on a corrected deceleration profile 2 in S740 (S750). Hereinafter, the correction of the deceleration profile by the apparatus 100 will be described in more detail with reference to FIG. 8.

Figure 8:
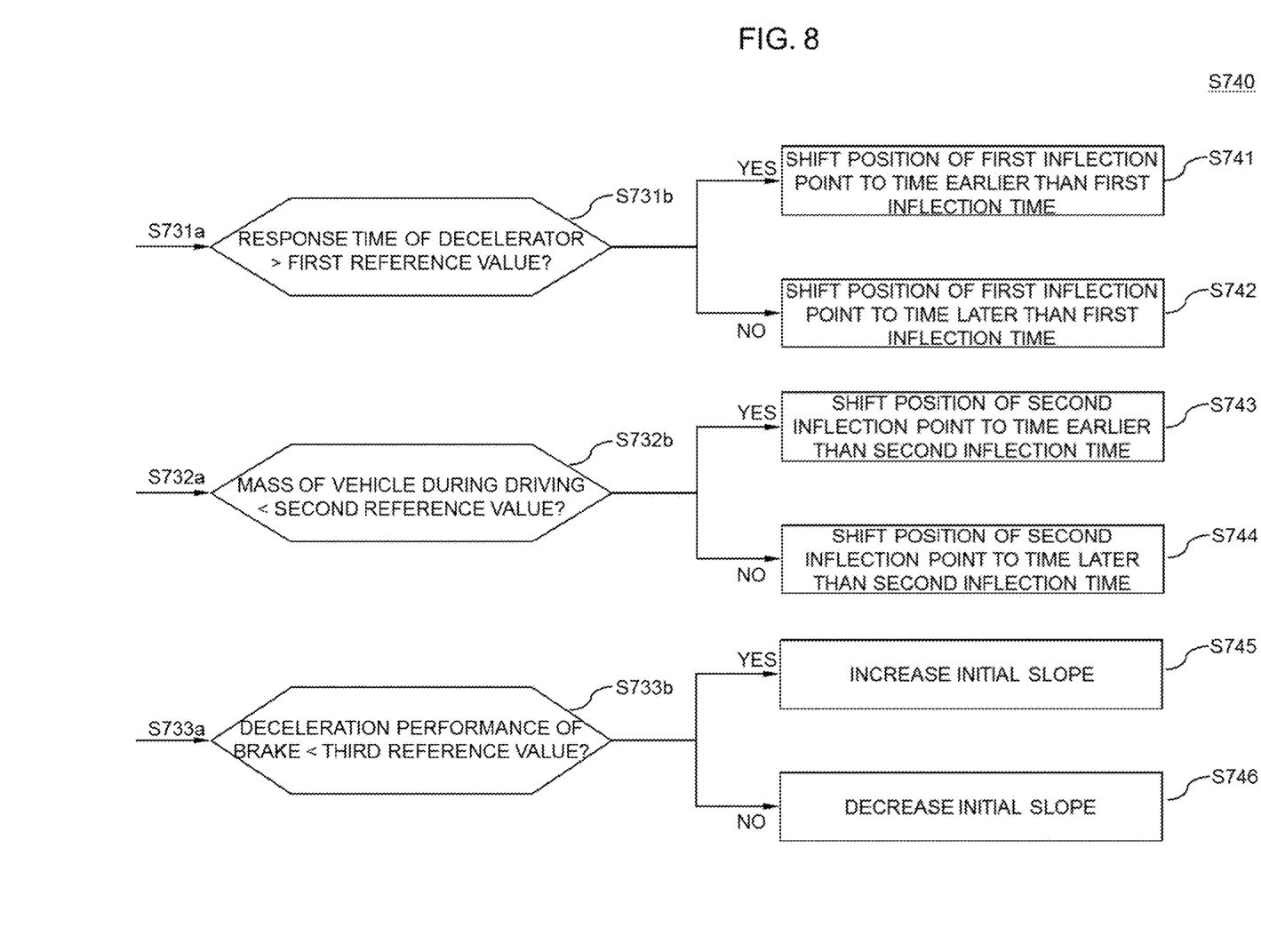
FIG. 8 is a flowchart illustrating the detailed procedure of S740 shown in FIG. 7.

FIG. 8 is a flowchart illustrating the detailed procedure of S740 shown in FIG. 7.

Referring to FIG. 8, the apparatus 100 may respectively determine whether or not the response time of the decelerator is greater than the first reference value, whether or not the mass of the vehicle during driving is less than the second reference value, and whether or not the deceleration performance of the brake is less than the third reference value (S731b, S732b and S733b).

As a result of the determination in S731b, when the response time of the decelerator is greater than the first reference value (YES), the apparatus 100 may correct the deceleration profile 1 so as to shift the position of the first inflection point P1 to a time earlier than a first time t1 (S741). Here, the first inflection point P1 may be a point at which the deceleration "a" has a local maximum value, and be adjusted depending on responsiveness of the decelerator.

On the other hand, as the result of the determination in S731b, when the response time of the decelerator is less than the first reference value (NO), the apparatus 100 may correct the deceleration profile 1 so as to shift the position of the first inflection point P1 to a time later than the first time t1 (S742). As such, the apparatus 100 may actively correct the deceleration profile in consideration of the delayed response or the early response of the decelerator, thereby being capable of improving ride comfort.

As a result of the determination in S732b, when the mass of the vehicle during driving is less than the second reference value (YES), the apparatus 100 may correct the deceleration profile 1 so as to shift the position of the second inflection point P2 to a time earlier than a second time t2 (S743). Here, the second inflection point P2 may be a point at which the deceleration "a" has a local minimum value, and be adjusted in consideration of inertial force to which a passenger in the vehicle is subjected.

On the other hand, as the result of the determination in S732b, when the response time of the decelerator is greater than the second reference value (NO), the apparatus 100 may correct the deceleration profile 1 so as to shift the position of the second inflection point P2 to a time later than the second time t2 (S744). As such, the apparatus 100 may actively correct the deceleration profile based on inertial force depending on the mass of the vehicle during driving, thereby being capable of improving ride comfort.

As a result of the determination in S733b, when the deceleration performance of the brake is less than the third reference value (YES), the apparatus 100 may correct the deceleration profile 1 so as to increase the initial slope s of the deceleration a (S745). Thereby, the apparatus 100 may increase a deceleration rate at the moment $t_s$ when braking of the vehicle is started, and compensate for insufficient grip force between the disc rotor 153a and the brake pad 153c, thereby reducing or minimizing noise and vibration of the brake 153.

On the other hand, as the result of the determination in S733b, when the deceleration performance of the brake is greater than the third reference value (NO), the apparatus 100 may correct the deceleration profile 1 so as to decrease the initial slope "s" of the deceleration a (S746). Thereby, the apparatus 100 may decrease an unnecessarily high deceleration rate, thereby being capable of improving fuel efficiency and braking efficiency.

The above-described method according to one form may be recorded as a program which may be executed in computers and be stored in a computer readable recording medium and, for example, computer readable recording media may include a ROM, a RAM, a CD-ROM, a magnetic tape, a floppy disk, an optical data storage device, etc.

The computer readable recording media may be distributed to computer systems connected by a network, and computer readable code may be stored and executed therein in a distributed manner. Further, functional programs, code and code segments to implement the above-described method may be easily deduced by programmers in the art to which the forms pertain.

The operations of the method or the functions described above in connection with the forms disclosed herein may be embodied directly in a hardware or a software module executed by the processor, or in a combination thereof.

As is apparent from the above description, an apparatus and method for controlling braking of an autonomous vehicle according to at least one form of the present disclosure may generate a deceleration profile for braking the vehicle based on a high-order polynomial so as to improve ride comfort of a passenger in the vehicle, and actively correct the deceleration profile by reflecting the response time of a decelerator and the deceleration performance of a brake in the deceleration profile so as to improve durability and reliability of a braking device.

While the present disclosure has been explained in relation to the forms thereof, it will be understood that various modifications thereof will become apparent to those skilled in the art upon reading the specification. Technical contents of the above-described forms may be combined into various forms unless they are mutually incompatible, and thereby, new forms may be implemented.

It will be apparent to those skilled in the art that various modifications and variations can be made in the present disclosure without departing from the spirit or scope of the present disclosure. Thus, it is intended that the present disclosure cover the modifications and variations of this present disclosure.

What is claimed is:

1. A method for controlling braking of an autonomous vehicle, the method comprising:
   recognizing, by a processor, a vehicle stop situation based on environment information around the vehicle;
   when the vehicle stop situation is recognized, generating, by the processor, a $n^{th}$-order (n being a natural number equal to or greater than three) polynomial-based deceleration profile having a plurality of inflection points;
   correcting, by the processor, the $n^{th}$-order polynomial-based deceleration profile by setting at least one of a response time of a decelerator, a mass of the vehicle during driving, or a deceleration performance of a brake to a control variable; and
   executing, by a controller, braking of the vehicle based on the corrected $n^{th}$-order polynomial-based deceleration profile,
   wherein the plurality of inflection points comprises:
      a first inflection point at which a deceleration has a local maximum value at a first time; and
      a second inflection point at which the deceleration has a local minimum value at a second time later than the first time,
   wherein, in correcting the $n^{th}$-order polynomial-based deceleration profile, when the response time of the decelerator is greater than a first reference value, the $n^{th}$-order polynomial-based deceleration profile is corrected so as to shift a position of the first inflection point to a time earlier than the first time.

2. The method according to claim 1, wherein, in generating the $n^{th}$-order polynomial-based deceleration profile, an initial slope of the $n^{th}$-order polynomial-based deceleration profile is determined based on at least one of a driving speed of the vehicle, a target braking distance, or a coefficient of friction of a road surface on which the vehicle is traveling.

3. The method according to claim 1, wherein, in correcting the $n^{th}$-order polynomial-based deceleration profile, when the response time of the decelerator is less than a first reference value, the $n^{th}$-order polynomial-based deceleration profile is corrected so as to shift a position of the first inflection point to a time later than the first time.

4. The method according to claim 1, wherein, in correcting the $n^{th}$-order polynomial-based deceleration profile, when the mass of the vehicle is less than a second reference value, the $n^{th}$-order polynomial-based deceleration profile is corrected so as to shift a position of the second inflection point to a time earlier than the second time.

5. The method according to claim 1, wherein, in correcting the $n^{th}$-order polynomial-based deceleration profile, when the mass of the vehicle is greater than a second reference value, the $n^{th}$-order polynomial-based deceleration profile is corrected so as to shift a position of the second inflection point to a time later than the second time.

6. The method according to claim 1, wherein, in correcting the $n^{th}$-order polynomial-based deceleration profile, when the deceleration performance of the brake is less than a third reference value, the $n^{th}$-order polynomial-based deceleration profile is corrected so as to increase the initial slope.

7. The method according to claim 1, wherein, in correcting the $n^{th}$-order polynomial-based deceleration profile, when the deceleration performance of the brake is greater than a third reference value, the $n^{th}$-order polynomial-based deceleration profile is corrected so as to decrease the initial slope.

8. A non-transitory computer-readable recording medium having an application program recorded thereon, the application program to direct a processor to perform acts of:
   recognizing, by a processor, a vehicle stop situation based on environment information around the vehicle;
   when the vehicle stop situation is recognized, generating, by the processor, a $n^{th}$-order (n being a natural number equal to or greater than three) polynomial-based deceleration profile having a plurality of inflection points;
   correcting, by the processor, the $n^{th}$-order polynomial-based deceleration profile by setting at least one of a response time of a decelerator, a mass of the vehicle during driving, or a deceleration performance of a brake to a control variable; and
   executing, by a controller, braking of the vehicle based on the corrected $n^{th}$-order polynomial-based deceleration profile,
   wherein the plurality of inflection points comprises:
      a first inflection point at which a deceleration has a local maximum value at a first time; and
      a second inflection point at which the deceleration has a local minimum value at a second time later than the first time,
   wherein, in correcting the $n^{th}$-order polynomial-based deceleration profile, when the response time of the decelerator is greater than a first reference value, the $n^{th}$-order polynomial-based deceleration profile is corrected so as to shift a position of the first inflection point to a time earlier than the first time.

9. An apparatus for controlling braking of an autonomous vehicle, the apparatus comprising:
   a processor configured to:
      recognize a vehicle stop situation based on environment information around the vehicle;
      generate a $n^{th}$-order (n being a natural number equal to or greater than three) polynomial-based deceleration profile having a plurality of inflection points, when the vehicle stop situation is recognized; and correct the $n^{th}$-order polynomial-based deceleration profile by setting at least one of a response time of a decelerator, a mass of the vehicle during driving, or a deceleration performance of a brake to a control variable; and a controller configured to execute braking of the vehicle based on the corrected $n^{th}$-order polynomial-based deceleration profile, wherein the plurality of inflection points comprises:
   a first inflection point at which a deceleration has a local maximum value at a first time; and
   a second inflection point at which the deceleration has a local minimum value at a second time later than the first time, wherein, when the response time of the decelerator is greater than a first reference value, the processor is configured to correct the $n^{th}$-order polynomial-based deceleration profile so as to shift a position of the first inflection point to a time earlier than the first time.

10. The apparatus according to claim 9, wherein the processor is configured to determine an initial slope of the $n^{th}$-order polynomial-based deceleration profile based on at least one of a driving speed of the vehicle, a target braking distance or a coefficient of friction of a road surface on which the vehicle is traveling.

11. The apparatus according to claim 9, wherein, when the response time of the decelerator is less than a first reference value, the processor is configured to correct the $n^{th}$-order polynomial-based deceleration profile so as to shift a position of the first inflection point to a time later than the first time.

12. The apparatus according to claim 9, wherein, when the mass of the vehicle is less than a second reference value, the processor is configured to correct the $n^{th}$-order polynomial-based deceleration profile so as to shift a position of the second inflection point to a time earlier than the second time.

13. The apparatus according to claim 9, wherein, when the mass of the vehicle is greater than a second reference value, the processor is configured to correct the $n^{th}$-order polynomial-based deceleration profile so as to shift a position of the second inflection point to a time later than the second time.

14. The apparatus according to claim 9, wherein, when the deceleration performance of the brake is less than a third reference value, the processor is configured to correct the $n^{th}$-order polynomial-based deceleration profile so as to increase the initial slope.

15. The apparatus according to claim 9, wherein, when the deceleration performance of the brake is greater than a third reference value, the processor is configured to correct the $n^{th}$-order polynomial-based deceleration profile so as to decrease the initial slope.

* * * * *